United States Patent
Choo et al.

(10) Patent No.: US 7,379,129 B2
(45) Date of Patent: May 27, 2008

(54) LIQUID CRYSTAL DISPLAY APPARATUS WHICH TRANSMITS LIGHT AT THE CIRCUMFERENCE OF THE MAIN IMAGE DISPLAY REGION AND METHOD OF MANUFACTURING THE SAME

(75) Inventors: Kyo-Seop Choo, Suwon-si (KR); Yong-Ho Yang, Seoul (KR); Jin-Suk Park, Seoul (KR); Ji-Hye Moon, Seoul (KR)

(73) Assignee: Samsung Electronics, Co. Ltd., Gyeonggi-Do (KR)

( * ) Notice: Subject to any disclaimer, the term of this patent is extended or adjusted under 35 U.S.C. 154(b) by 0 days.

(21) Appl. No.: 10/819,758

(22) Filed: Apr. 6, 2004

(65) Prior Publication Data

US 2005/0068484 A1  Mar. 31, 2005

(30) Foreign Application Priority Data

Sep. 29, 2003 (KR) ............ 10-2003-0067316

(51) Int. Cl.
*G02F 1/1335* (2006.01)
*G02F 1/1333* (2006.01)
*G02F 1/1343* (2006.01)

(52) U.S. Cl. .................. 349/61; 349/56; 349/110; 349/139

(58) Field of Classification Search ............... 349/144, 349/106

See application file for complete search history.

(56) References Cited

U.S. PATENT DOCUMENTS

| 5,373,378 | A | * | 12/1994 | Takubo et al. ............... 349/33 |
| 5,617,230 | A | * | 4/1997 | Ohgawara et al. ........... 349/110 |
| 5,719,648 | A | * | 2/1998 | Yoshii et al. ................. 349/42 |
| 5,822,028 | A | * | 10/1998 | Miyawaki ................... 349/111 |
| 5,877,830 | A | * | 3/1999 | Shimada et al. ............ 349/110 |
| 6,255,705 | B1 | * | 7/2001 | Zhang et al. ................ 257/412 |
| 6,348,958 | B1 | * | 2/2002 | Matsuoka et al. ........... 349/106 |
| 2002/0071018 | A1 | * | 6/2002 | Cheng ........................ 349/141 |

* cited by examiner

*Primary Examiner*—Andrew Schechter
*Assistant Examiner*—W. Patty Chen
(74) *Attorney, Agent, or Firm*—MacPherson Kwok Chen & Heid LLP; Mark Pellegrini

(57) ABSTRACT

An LCD apparatus includes first and second substrates, and a liquid crystal layer. The first substrate includes a main region having switching device and first electrodes, and a sub region having a second electrode. The switching device applies a data signal to the first electrodes in response to a gate signal applied to the second electrodes. The sub region is disposed at a circumference of the main region. The second substrate includes a third electrode that faces the first and second electrodes. A reference signal that has a different magnitude from the gate signal is applied to the third electrode. The liquid crystal layer is interposed between the first and second substrates. According to an embodiment of the present invention, a bright line surrounds main region through which images are displayed. Thus, the bright line brings out the images. That is, the images are better defined.

11 Claims, 22 Drawing Sheets

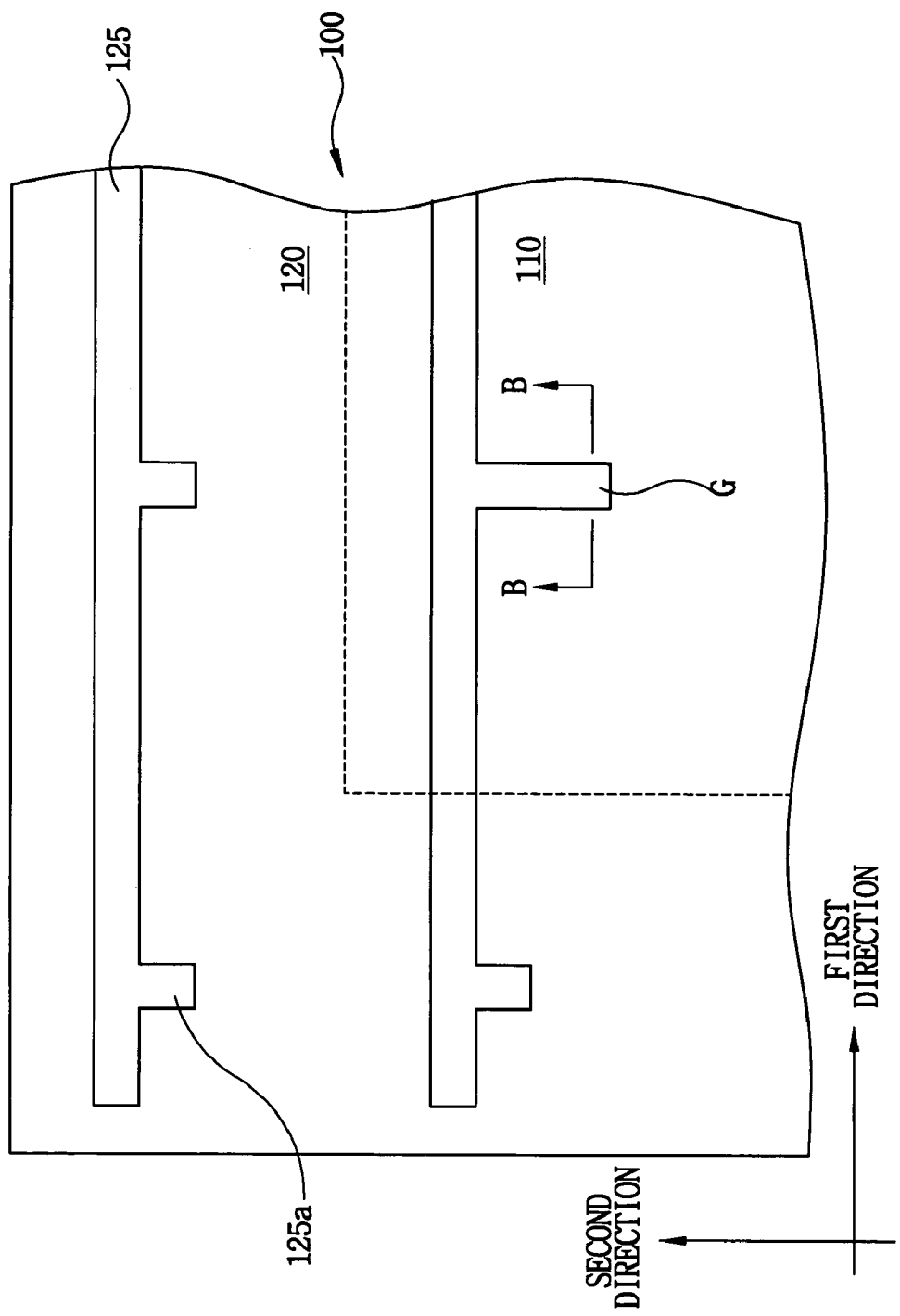

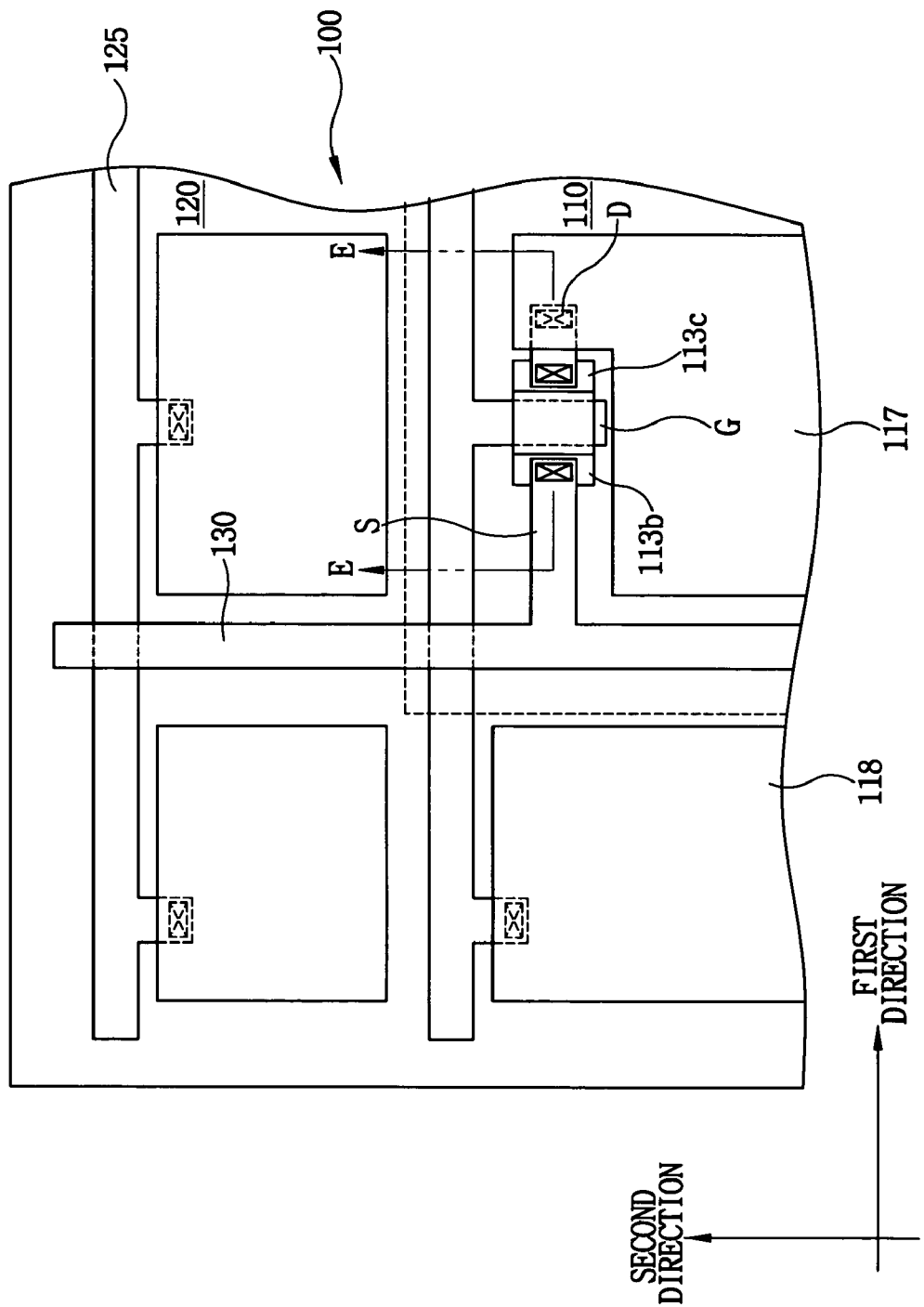

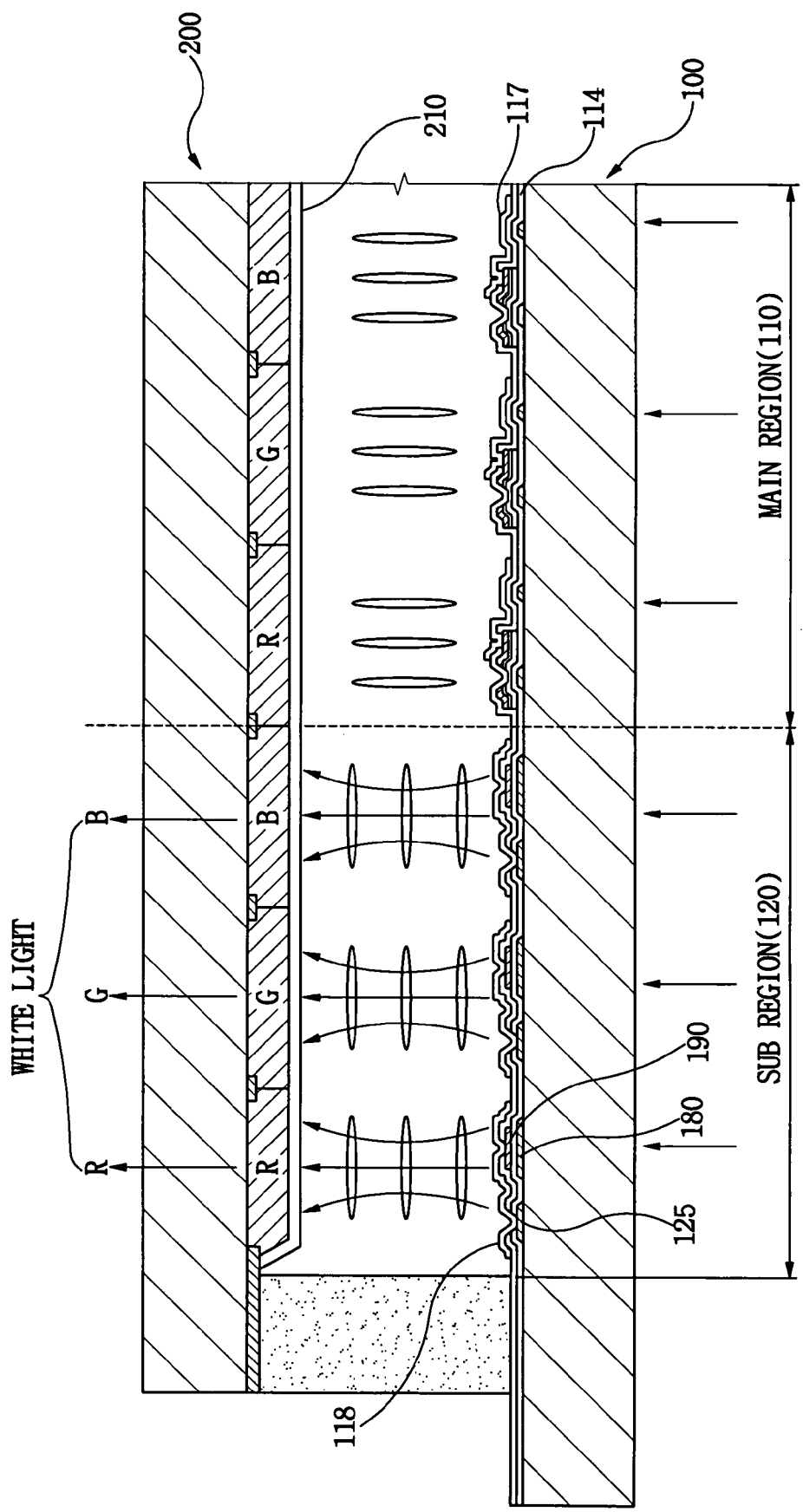

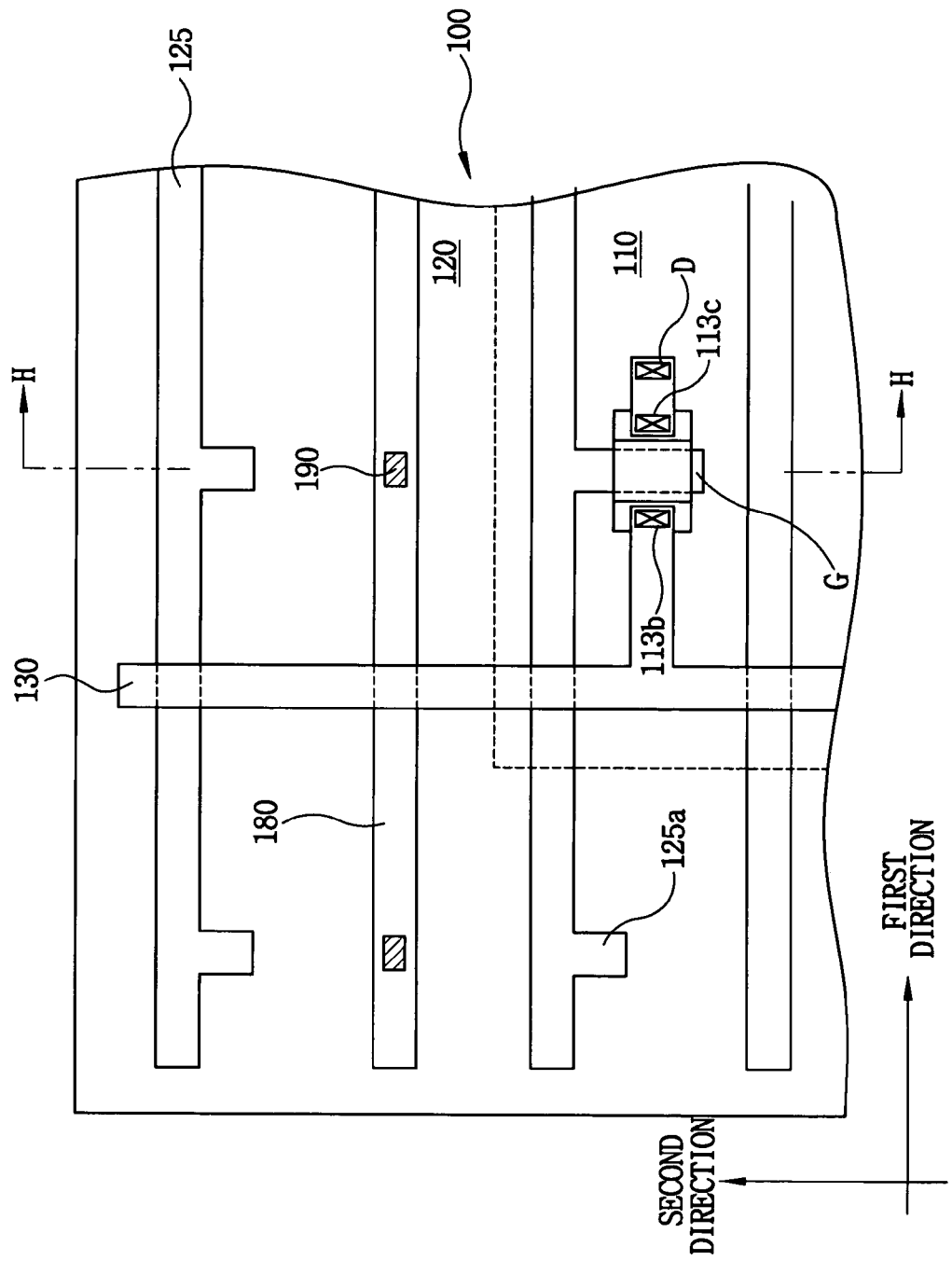

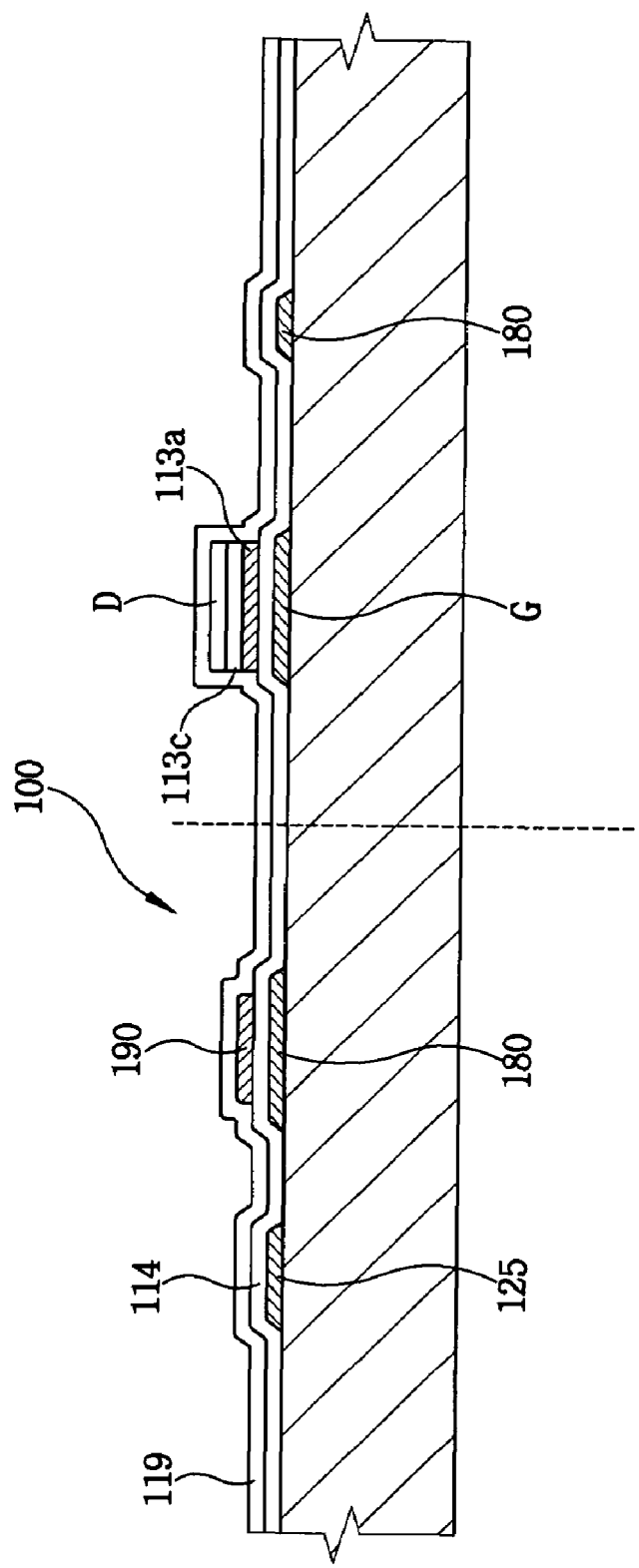

LIQUID CRYSTAL DISPLAY APPARATUS WHICH TRANSMITS LIGHT AT THE CIRCUMFERENCE OF THE MAIN IMAGE DISPLAY REGION AND METHOD OF MANUFACTURING THE SAME

CROSS-REFERENCE TO RELATED APPLICATIONS

This application relies for priority upon Korean Patent Application No.2003-67316 filed on Sep. 29, 2003, the contents of which are herein incorporated by reference in its entirety.

BACKGROUND OF THE INVENTION

1. Field of the Invention

The present invention relates to a liquid crystal display apparatus and a method of manufacturing the liquid crystal display apparatus, and more particularly to a liquid crystal display apparatus that brings out images displayed on the liquid crystal display apparatus and a method of manufacturing the liquid crystal display apparatus.

2. Description of the Related Art

Generally, when electric field is applied to liquid crystal, an arrangement of liquid crystal is adjusted, so that optical transmittance of the liquid crystal is changed.

A liquid crystal display apparatus uses the liquid crystal to transform an electrical signal generated from an information processing device into a visible image.

The liquid crystal display apparatus includes a liquid crystal control module and a light supplying module.

The liquid crystal control module controls an arrangement of liquid crystal molecules. The liquid crystal control module includes an effective display region and a non-effective display region. An image is display via the effective display region. The non-effective display region surrounds the effective display region.

The light supplying module provides the liquid crystal control module with a light.

Recently, many researches for developing a display apparatus for prominent images have been performed.

SUMMARY OF THE INVENTION

The present invention provides a liquid crystal display apparatus that brings out images displayed via the liquid crystal display apparatus.

The present invention also provides a method of manufacturing the liquid crystal display apparatus.

In an exemplary liquid crystal display apparatus of the present invention, the liquid crystal display apparatus includes first and second substrates, and a liquid crystal layer. The first substrate includes a main region and a sub region. The main region has a switching device and first electrodes. The switching device applies a data signal to the first electrodes in response to a gate signal. The sub region has second electrodes. The gate signal is applied to the second electrodes. The sub region is disposed at a circumference of the main region. The second substrate includes third electrode that faces the first and second electrodes. A reference signal having a different magnitude from the gate signal is applied to the third electrode. The liquid crystal layer is interposed between the first and second substrates.

In an exemplary method of manufacturing the liquid crystal display apparatus of the present invention, a first signal line for transferring a gate signal is formed on a first transparent substrate that has a first main region and a first sub region surrounding the first main region. An insulation layer is formed on the first main region and first sub region. A channel layer is formed on the insulation layer that allows an electron to pass in response to the gate signal. A drain electrode and a second signal line having a source electrode are formed, such that the drain electrode and the source electrode being disposed on the channel layer. A data signal is applied to the source electrode. First and second electrodes are formed in the main and sub regions respectively. The first electrode is electrically connected to the drain electrode, and the second electrode is electrically connected to the first signal line. A third electrode is formed on a second transparent substrate having a second main region and second sub region. The second main region and the second sub region face the first main region and the first sub region respectively. The reference signal is applied to the third electrode. The liquid crystal layer is interposed between the first and third electrodes, and between the second and third electrodes.

According to an embodiment of the present invention, a bright line surrounds main region through which images are displayed. Thus, the bright line brings out the images. That is, the images are better defined.

BRIEF DESCRIPTION OF THE DRAWINGS

The above and other features and advantage points of the present invention will become more apparent by describing in detail exemplary embodiments thereof with reference to the accompanying drawings, in which:

FIGS. 6A to 6H are schematic views showing a process of manufacturing a liquid crystal display apparatus according to the first exemplary embodiment of the present invention;

FIG. 8 is a cross-sectional view showing a liquid crystal display apparatus according to a second exemplary embodiment of the present invention; and FIGS. 9A to 9H are schematic views showing a method of manufacturing the liquid crystal display apparatus according to the second exemplary embodiment of the present invention.

DESCRIPTION OF THE PREFERRED EMBODIMENTS

Hereinafter, the preferred embodiments of the present invention will be described in detail with reference to the accompanied drawings.

Embodiments of Liquid Crystal Display Apparatus

Embodiment 1

Figure 1:
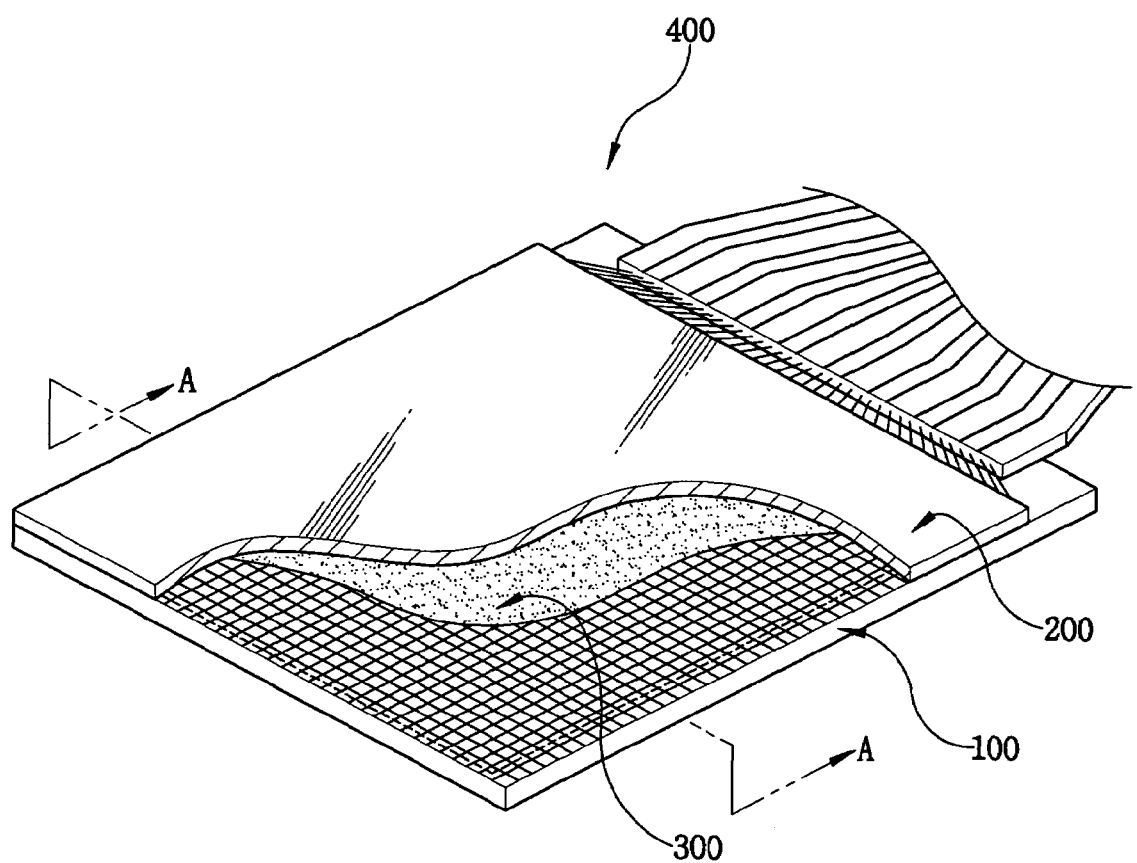
FIG. 1 is a partially cut out perspective view showing a liquid crystal display apparatus according to a first exemplary embodiment of the present invention.
Figure 2:
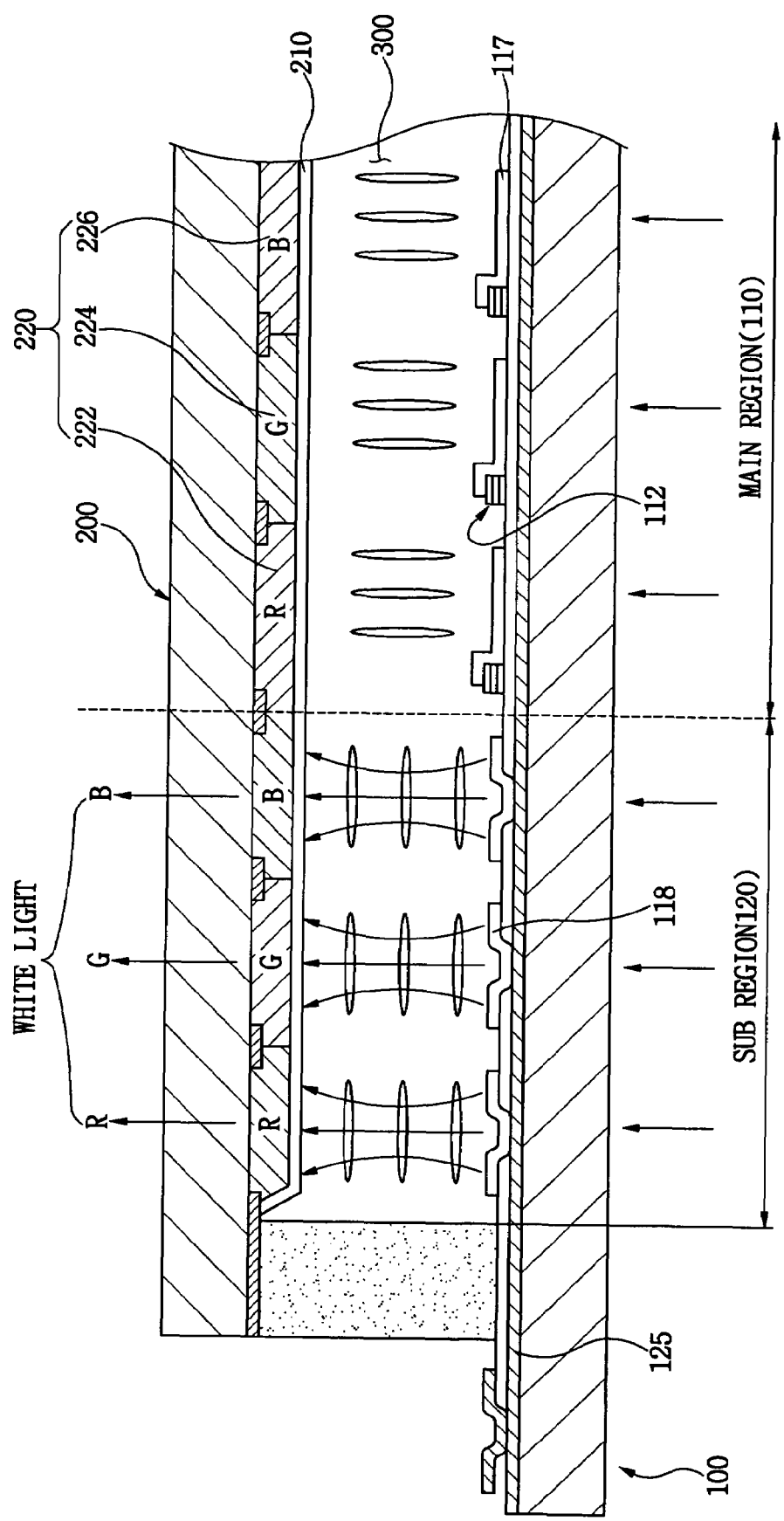
FIG. 2 is a cross-sectional view taken along the line A-A of FIG. 1.

FIG. 1 is a partially cut out perspective view showing a liquid crystal display apparatus according to a first exemplary embodiment of the present invention, and FIG. 2 is a cross-sectional view taken along the line A-A of FIG. 1.

Referring to FIGS. 1 and 2, a liquid crystal display apparatus 400 includes first and second substrates 100 and 200, and a liquid crystal layer 300. For example, the liquid crystal display apparatus 400 disclosed in FIGS. 1 and 2, corresponds to a transmissive type. However, the present embodiment may be applied to a transmissive type and a reflective and transmissive type.

Figure 3:
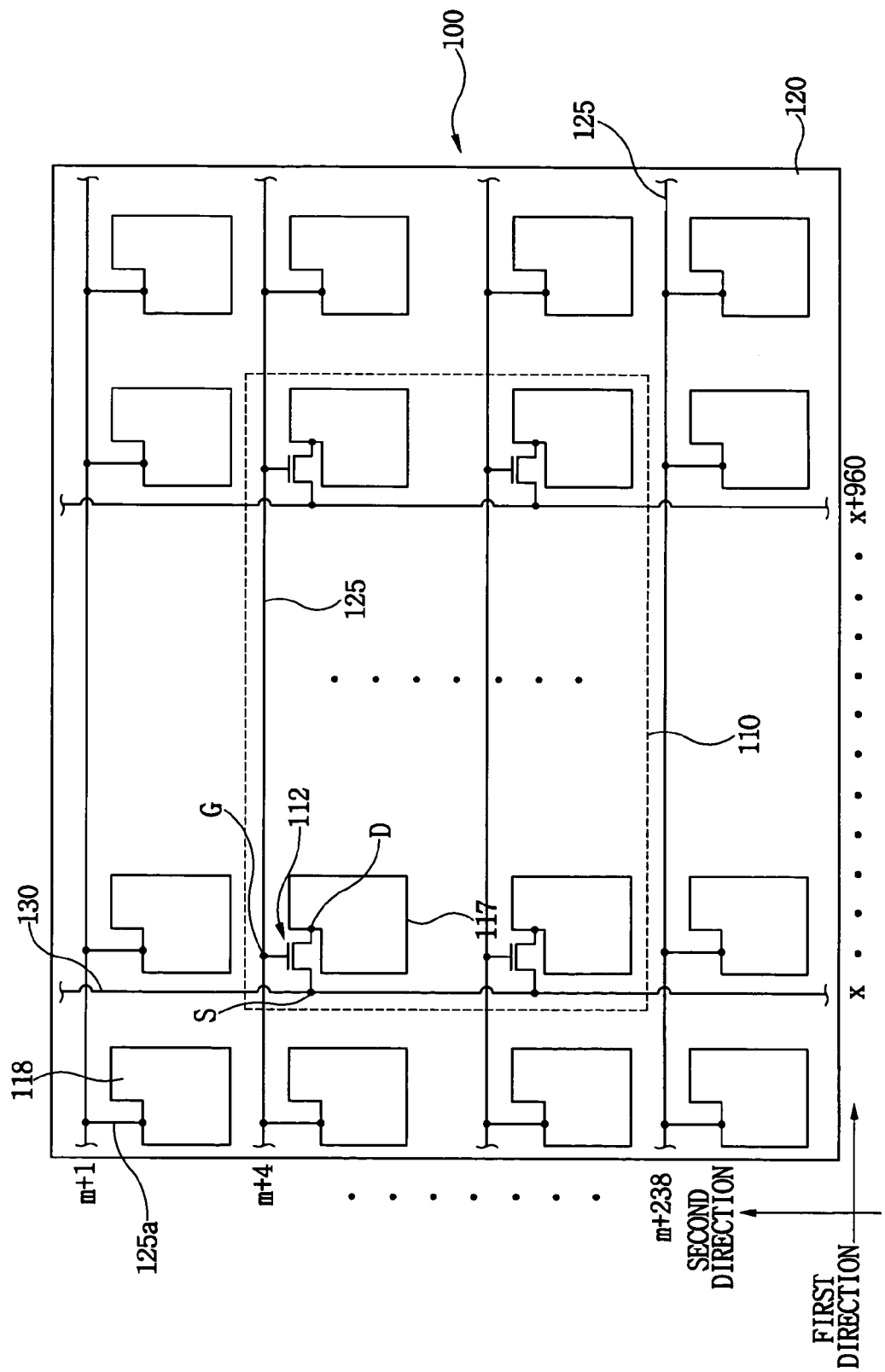
FIG. 3 is a schematic view showing a first substrate of FIG. 1.

FIG. 3 is a schematic view showing a first substrate of FIG. 1.

Referring to FIGS. 2 and 3, a first substrate 100 includes a main region 110 and a sub region 120. The main region 110 having a rectangular shape is disposed at a center portion of a first substrate 100. The sub region 120 surrounds the main region 110.

The main region 110 includes a switching device 112 and a first electrode 117.

Figure 4:
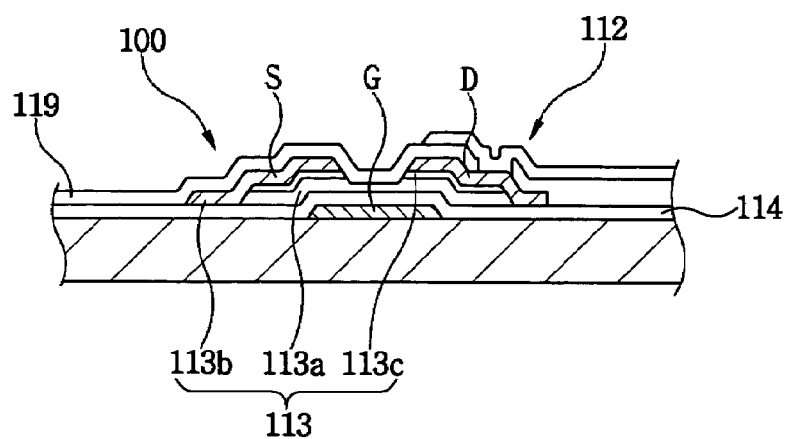
FIG. 4 is a schematic cross-sectional view showing a switching device of FIG. 4.

FIG. 4 is a schematic cross-sectional view showing a switching device of FIG. 4.

Referring to FIGS. 2 and 4, a plurality of switching devices 112 is formed in the main region 110, such that the switching devices 112 are arranged in a matrix shape.

Each of the switching devices 112 includes a gate electrode G, a channel layer 113, a source electrode S and a drain electrode D. A gate insulation layer 114 electrically insulates the channel layer 113 of the switching device 112 from the gate electrode G. The channel layer 113 includes an amorphous silicon pattern 113a, first and second n+ amorphous silicon patterns 113b and 113c. The amorphous silicon pattern 113a is formed on the gate insulation layer, such that the amorphous silicon pattern 113a is disposed over the gate electrode G. The first and second n+ amorphous silicon patterns 113b and 113c are formed on the amorphous silicon pattern 113a, such that the first and second amorphous silicon patterns 113b and 113c are disposed apart from each other. The first n+ amorphous silicon pattern 113b makes electrical contact with the source electrode S, and the second n+ amorphous silicon pattern 113c makes electrical contact with the drain electrode D.

Each of the switching devices 112 outputs a data signal of a second level in response to a gate signal of a first level. In detail, the data signal applied to the source electrode S is transferred to the drain electrode D via the channel layer 113 in response to the gate signal that is applied to the gate electrode G.

The first level of the gate signal is substantially same as or higher than a threshold voltage Vth of the amorphous silicon pattern 113a. The first level may be out of range from about 10V to about −10V.

Referring again to FIG. 3, a first signal line 125 is formed on the first substrate 100. The gate signal is applied to the switching device 112 via the first signal line 125. The first signal line 125 is electrically connected to the gate electrode G of the switching device 112 arranged in a matrix shape.

The first signal line 125 is electrically connected to the entire gate electrodes G of switching devices 112 disposed in a same row. Thus, the gate signal applied to the first signal line 125 is applied simultaneously to all of the gate electrodes G of the switching devices 112 that is disposed at a same row.

A resolution of the liquid crystal display apparatus determines a number (or count) of the first signal line 125 and the switching device 112. For example, a quarter video graphics array (qVGA) liquid crystal display apparatus of which resolution is 240×320 includes 240×320×3 number of switching devices 112 arranged in a matrix shape. Thus, the qVGA liquid crystal display apparatus includes 240 number of first signal lines 125. In detail, the first signal lines m+1, m+2 and m+3 are disposed in the sub region 120. The first signal lines m+238, m+239 and m+240 are disposed in the sub region 120, such that the first signal lines m+238, m+239 and m+240 are disposed at opposite side of the first signal lines m+1, m+2 and m+3. The first signal lines m+1, m+2, m+3, m+238, m+239 and m+240 are extended in a first direction.

The first signal lines m+4 to m+237 are disposed in the main region 110, such that the first signal lines m+4 to m+237 are extended in a first direction. The qVGA liquid crystal display apparatus according to the present invention includes, for example, same number of first lines and switching devices as the general qVGA liquid crystal display apparatus. However, the 240×320×3 number of switching devices and 240 number of switching lines 125 may be formed in the main region, and additional switching device and first signal lines may be formed in the sub region.

The data signal of a second level is applied to a source electrode S of the switching devices 112. A second signal line 130 is electrically connected to source electrodes S of switching devices 112 disposed on a same column. Thus, the qVGA liquid crystal display apparatus includes 320×3 number of second signal lines 130. The second signal lines x+1 to x+960 are extended in a second direction that is substantially perpendicular to the first direction. A protection layer 119 of FIG. 4 covers the first and second signal lines 125 and 130, and a switching device 112.

A first electrode 117 is disposed on the protection layer 119 of the main region 110. The first electrode 117 is electrically connected to the drain electrode D of the switching device 112. The first electrode comprises a material that is electrically conductive and optically transparent, for example, such as indium tin oxide, indium zinc oxide, etc.

Referring again to FIGS. 3 and 4, the data signal of the second level is applied to the amorphous silicon pattern 113a of the channel layer 113 via the second signal line 130 and source electrode S. Then, the gate signal of the first level is applied to the gate electrode via the first signal line 110. Thus, current may flow via the amorphous silicon pattern 113a of the channel layer 113, so that the data signal is transferred to the drain electrode D via the amorphous silicon pattern 113a. Then, the data signal is applied to the first electrode 117.

A second electrode 118 is disposed on the protection layer 119 of the sub region 120. In addition, the second electrode 118 comprises the material that is electrically conductive and optically transparent, for example, such as indium tin oxide (ITO), indium zinc oxide (IZO), etc. The second electrode 118 is electrically connected to a voltage applying portion 125a that is electrically connected to the first signal line 125. Thus, the gate signal is applied to the second electrode 118. The second electrode 118 is disposed in and along the sub region 120. A plurality of the second electrodes 118 may be arranged in a plurality of columns. For example, three columns are formed in the sub region 120.

Figure 5:
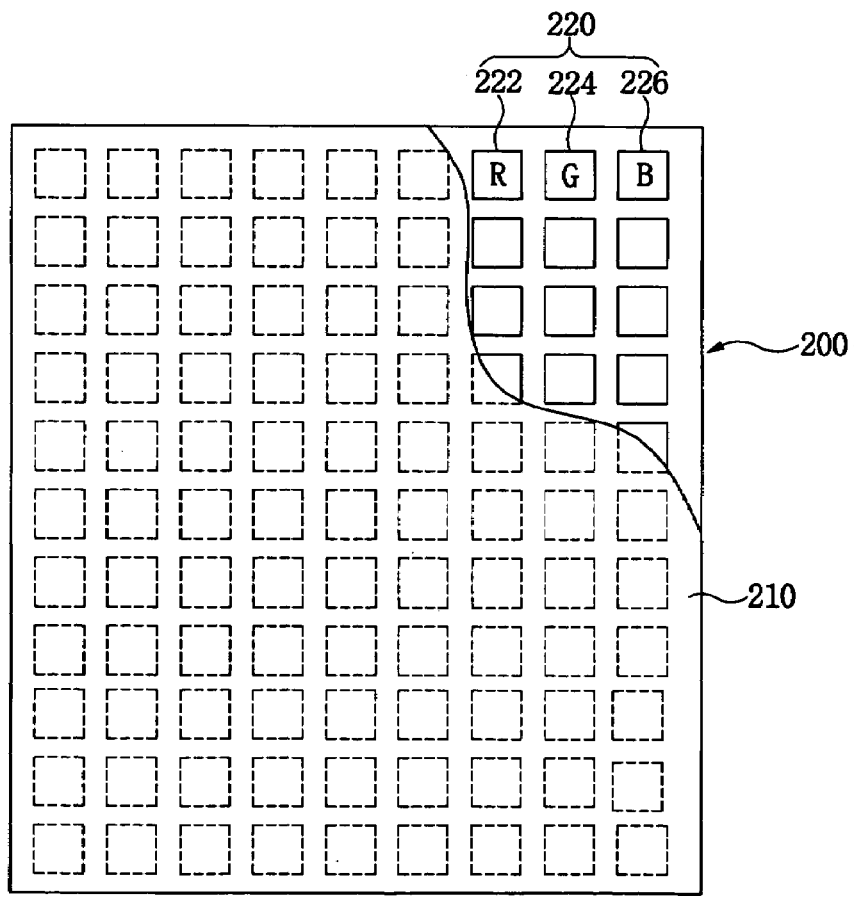
FIG. 5 is a schematic view showing a second substrate of FIG. 1.

FIG. 5 is a schematic view showing a second substrate of FIG. 1.

Referring to FIGS. 2 and 5, the second substrate 200 includes a third electrode 210 that faces the first and second electrodes 117 and 118. The third electrode comprises the material that is electrically conductive and optically transparent, for example, such as indium tin oxide and indium zinc oxide. The third electrode 210 covers the second substrate 200. A reference signal of a third level is applied to the third electrode 210. The third level of the reference signal and the first level of the gate signal have different voltage with each other, so that electric fields are formed between the second electrode 118 and third electrode 210 at all times.

The second substrate 200 may include color filters 220 to display colored images in the main region 110, and allow light to exit from the sub region 120.

The color filter 220 is disposed under the third electrode 210. The color filter 220 includes a red color filter 222, a green color filter 224 and a blue color filter 226. The red, green and blue color filters 222, 224 and 226 are disposed, such that the red, green and blue color filters 222, 224 and 226 correspond to the first and second electrodes 117 and 118.

Referring again to FIG. 2, the liquid crystal layer 300 is interposed between the first and second substrates 100 and 200. For example, the liquid crystal display apparatus 300 corresponds to a normally black mode type. The liquid crystal layer 300 may correspond to a vertical alignment (VA) mode.

Electric fields are formed between the second and third electrodes 118 and 210 disposed in the sub region 120 as long as the liquid crystal display apparatus displays an image. Thus, a light may pass through the sub region 120 as long as the liquid crystal display apparatus displays an image. Thus, image is displayed via the main region 110, but a bright line is displayed via the sub region 120 that surrounds the main region 110.

According to the present invention, the bright line surrounds the circumference of the displayed image. Thus, the image displayed via the main region is better defined.

Hereinafter, a method of manufacturing the liquid crystal display apparatus according to the first exemplary embodiment of the present invention will be explained.

Figure 6B:
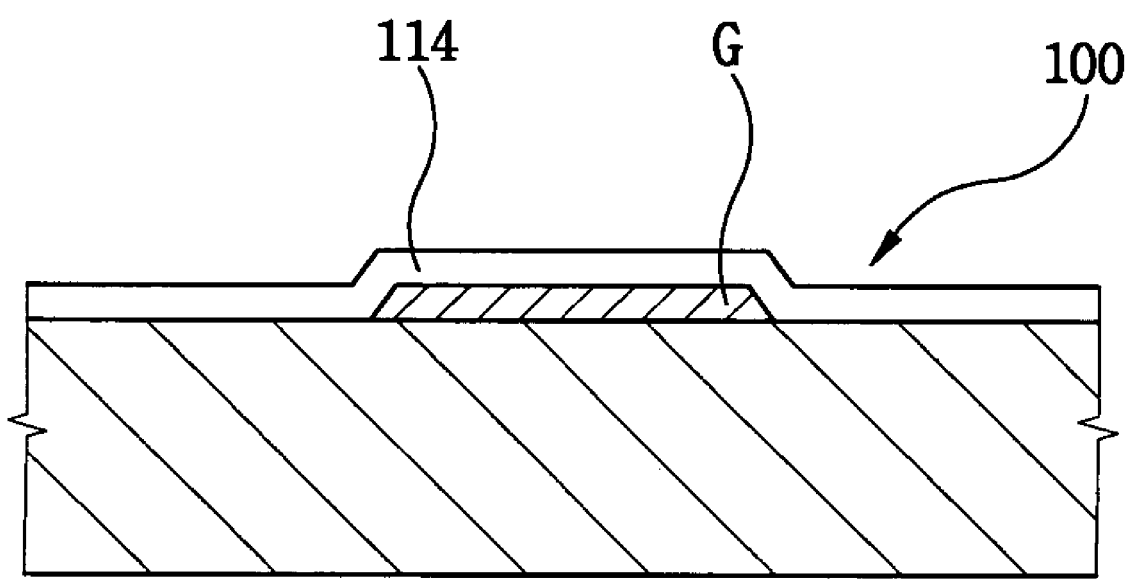

FIG. 6A is a schematic layout showing a first signal line that is formed on the first substrate, and FIG. 6B is a cross-sectional view taken along the line B-B of FIG. 6A.

Referring to FIGS. 6A and 6B, a metal film is formed on a first substrate 100. The metal film comprising aluminum (Al) or an aluminum alloy, etc., may be formed on the first substrate 100 via sputtering method, chemical vapor deposition, etc.

The metal film is patterned via photolithography and etching to form a first signal line 125 of the first substrate 100.

For example, in case of qVGA liquid crystal display apparatus, 240 number of first signal line 125 is formed. The first signal lines 125 are formed on both of main and sub regions 110 and 120, such that the first signal lines 125 are spaced apart by a same distance with each other. The first signal lines 125 are extended in a first direction, and disposed in parallel with each other in a second direction.

A gate electrode G protrudes from the first signal line 125, such that the gate electrode G is disposed in the main region 110. A voltage applying portion 125a protrudes from the first signal line 125, such that the voltage applying portion 125a is disposed in the sub region 120.

Referring to FIG. 6B, a gate insulation layer 114 is formed on the first substrate 110 having the gate electrode G formed on the first substrate 110.

Figure 6C:
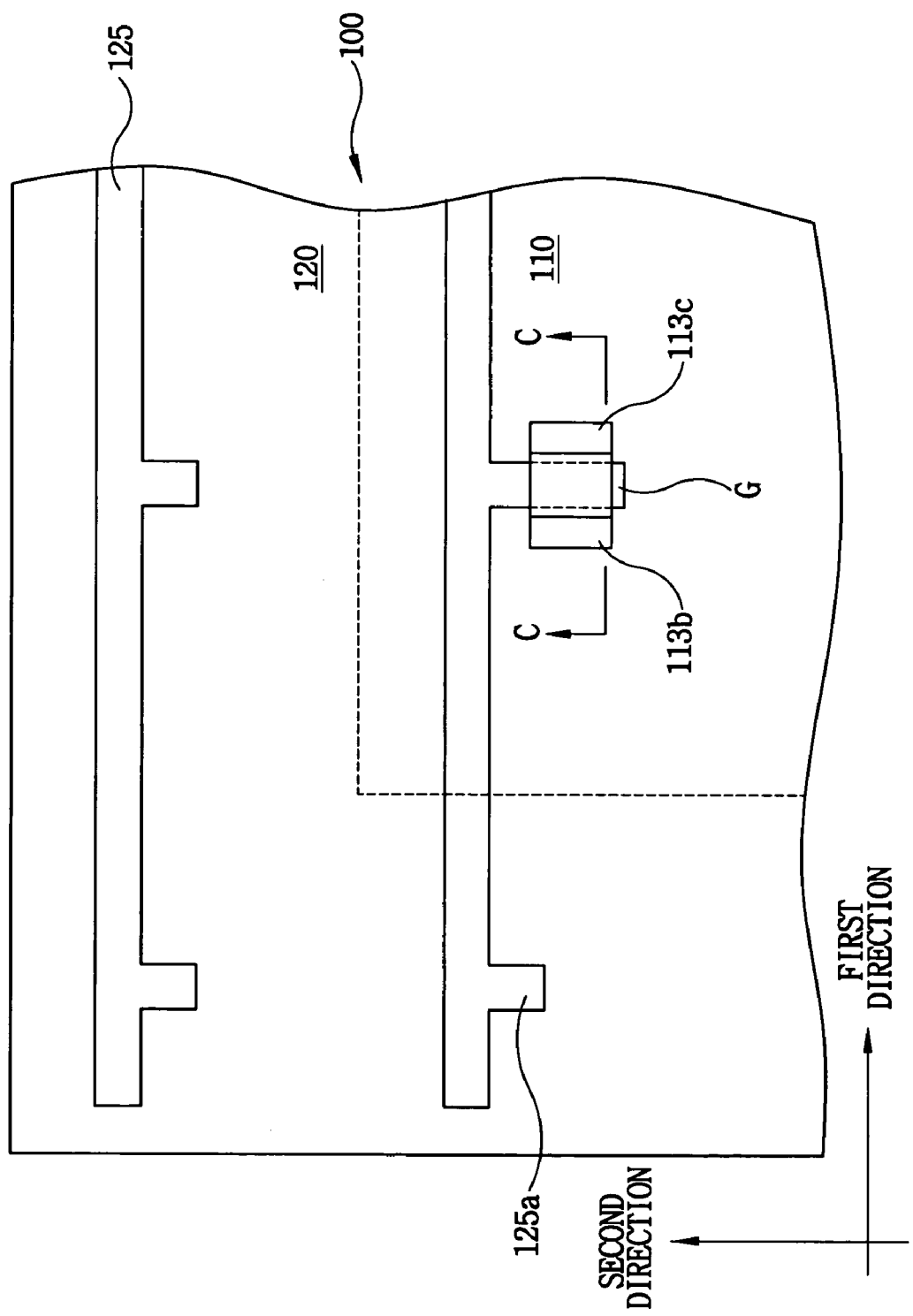
Figure 6D:
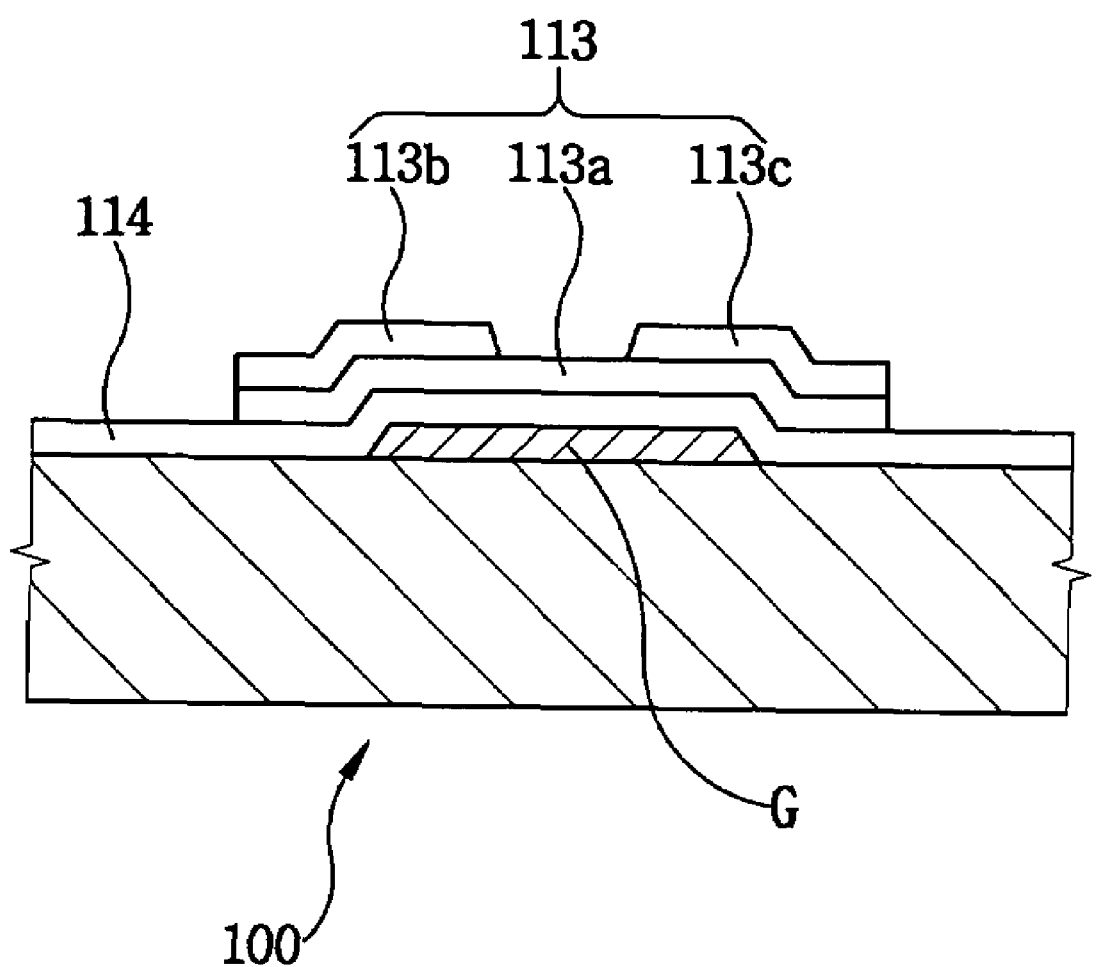

FIG. 6C is a schematic layout showing a channel layer formed on a gate electrode, and FIG. 6D is a cross-sectional view taken along the line C-C.

Referring to FIGS. 6C and 6D, an amorphous silicon layer and an n+ amorphous silicon layer are formed on a gate insulation layer 114 in sequence. The amorphous silicon layer and n+ amorphous silicon layer are patterned via photolithography and etching to form a channel layer 113.

The channel layer 113 includes an amorphous silicon pattern 113a that covers the gate electrode G, and first and second n+ amorphous silicon patterns 113b and 113c formed on the amorphous silicon pattern 113a. The first and second n+ amorphous silicon patterns 113b and 113c are spaced apart with each other.

Figure 6E:
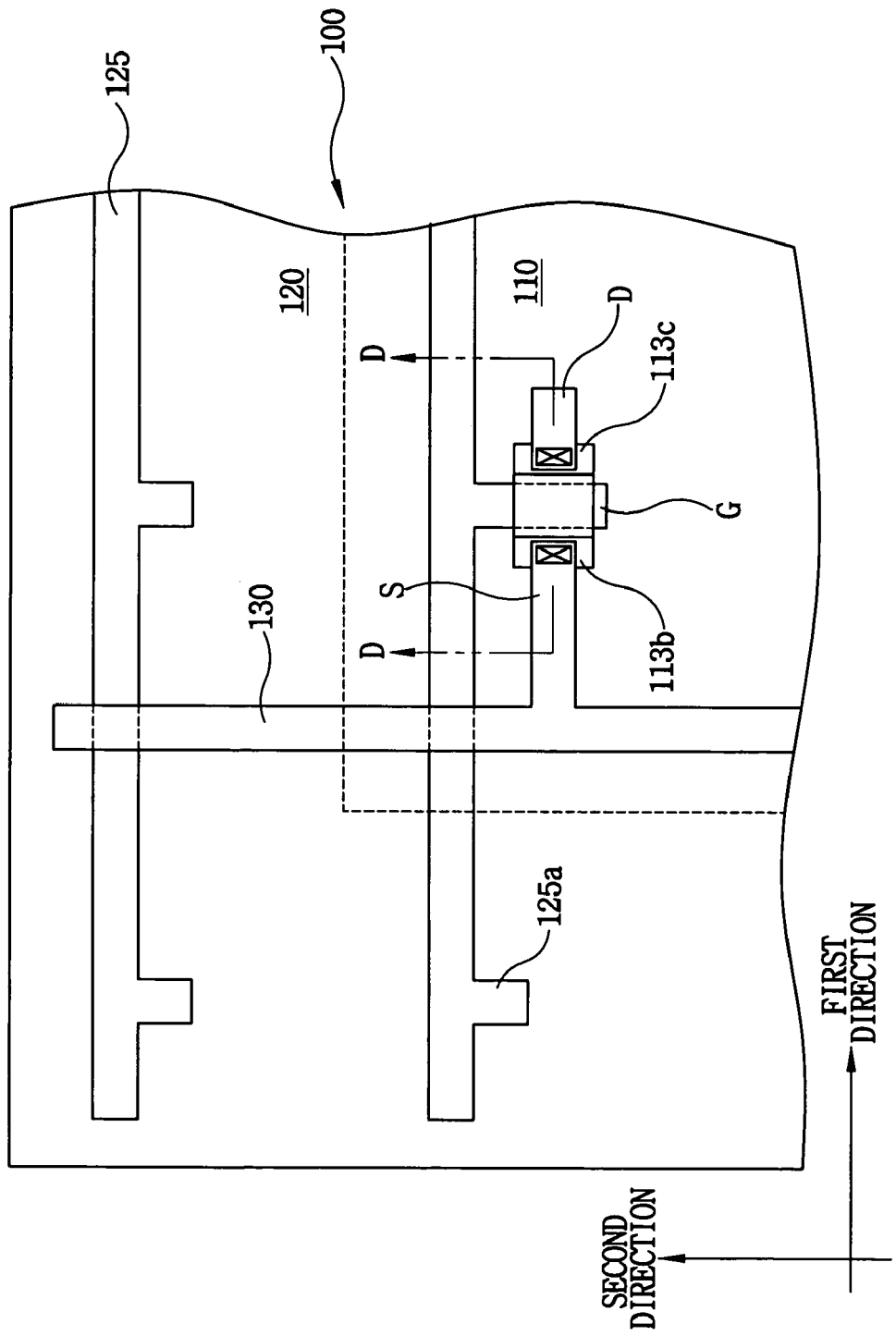
Figure 6F:
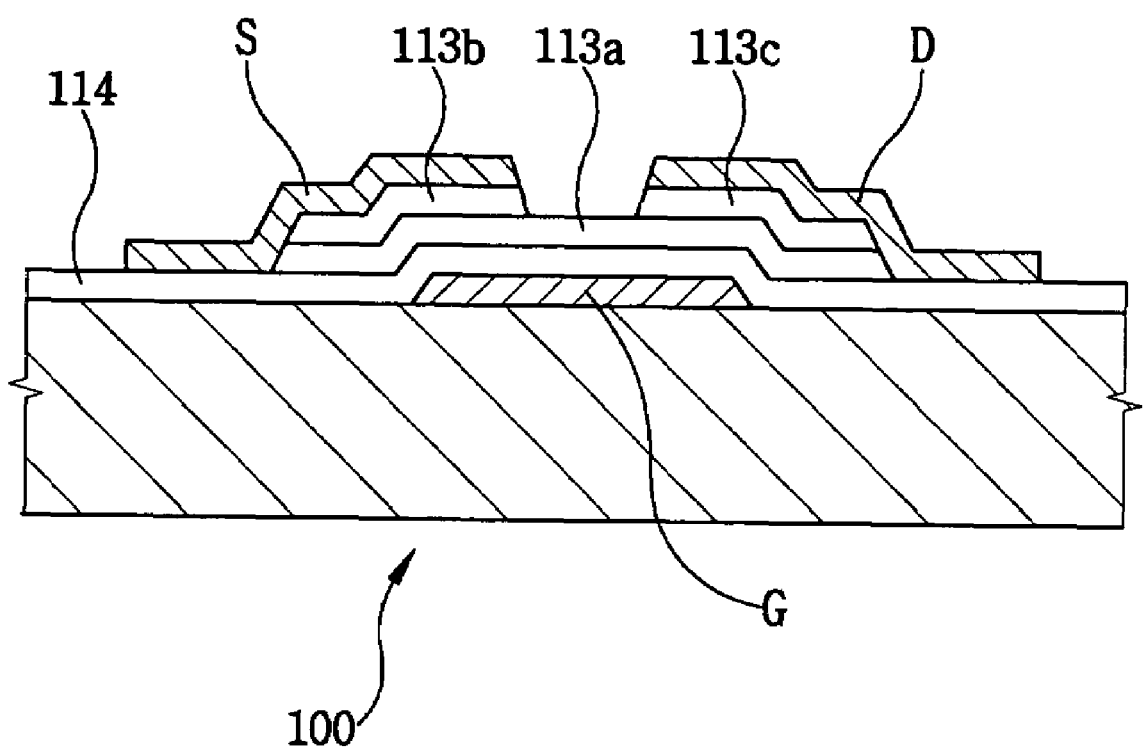

FIG. 6E is a schematic layout showing a channel layer electrically connected to a second signal line and a drain electrode, and FIG. 6F is a cross-sectional view taken along the line D-D of FIG. 6E.

Referring to FIGS. 6E and 6F, a metal layer is formed on a first substrate 110, such that the metal layer covers a channel layer 113. The metal layer may be formed on the substrate 110 by sputtering, chemical vapor deposition, etc. Then, the metal is patterned by photolithography and etching to form source and drain electrodes, and a second signal line 130. The second signal line 130 is extended in a second direction that is substantially perpendicular to the first direction. The source electrode S protrudes from the second signal line 130, and the source electrode S is electrically connected to the first n+ amorphous silicon pattern 113b. The drain electrode D is electrically connected to the second n+ amorphous silicon pattern 113c. A protection layer may be formed on the source and drain electrodes.

Figure 6H:
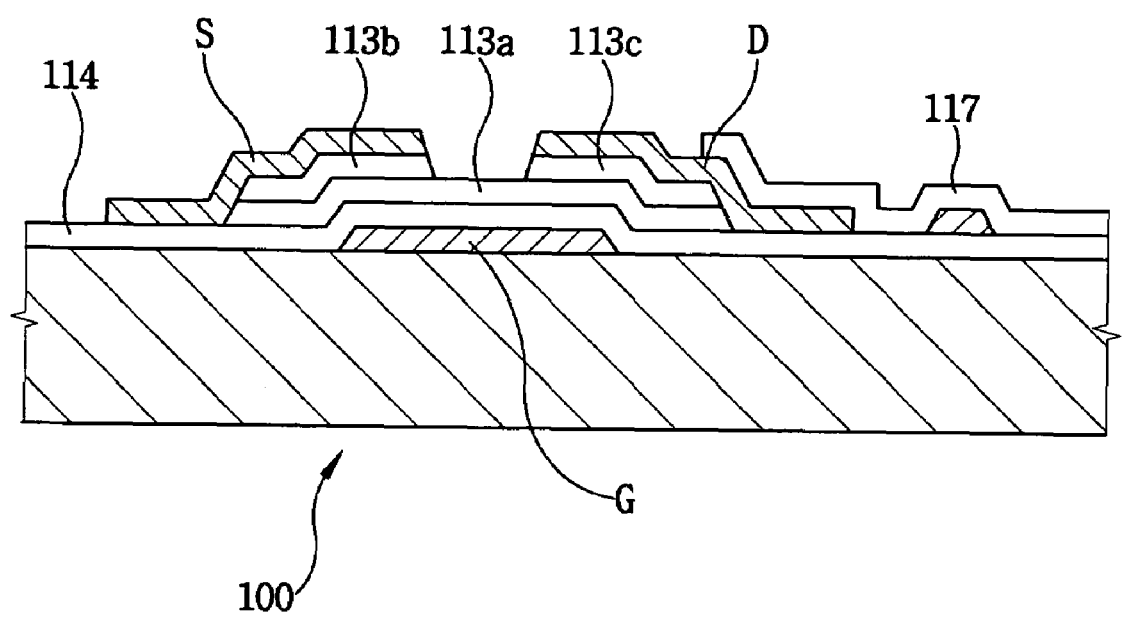

FIG. 6G is a schematic layout showing first and second electrodes formed in main and sub regions respectively, and FIG. 6H is a cross-sectional view taken along the line E-E.

Referring to FIGS. 6G and 6E, a thin film comprising a material that is electrically conductive and optically transparent, such as indium tin oxide and indium zinc oxide, is formed on a protection layer or drain and source electrodes. The thin film is patterned to form first and second electrodes 117 and 118 on both of main and sub regions 110 and 120, respectively. The first electrode 117 is electrically connected to the drain electrode D, and the second electrode 118 is electrically connected to a voltage applying portion 125a of the first signal line 125. Then, the first substrate 110 is completely formed.

Figure 7:
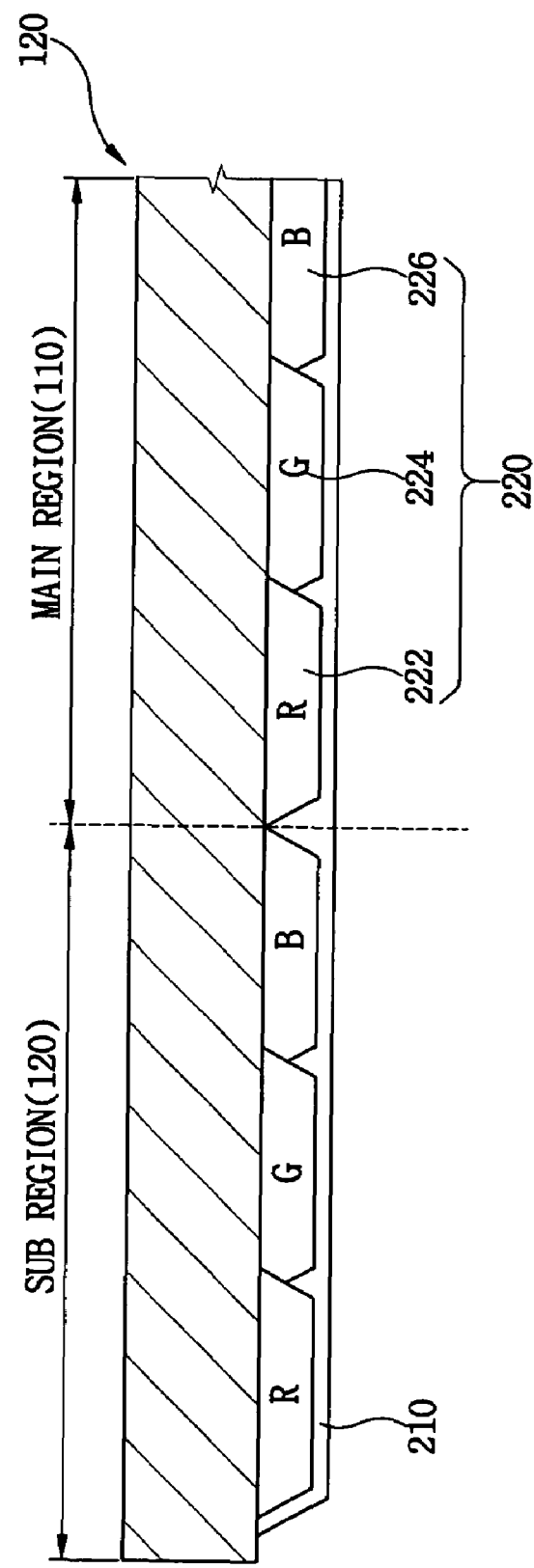
FIG. 7 is a schematic view showing a second substrate according to the first exemplary embodiment of the present invention.

FIG. 7 is a schematic view showing a second substrate according to the first exemplary embodiment of the present invention.

Referring to FIG. 7, a second substrate 200 includes color filters 220 and a third electrode 210. The color filters 220 are formed, such that the color filters 220 face the first and second electrodes 117 and 118. The color filters 220 include a red-color filter 222, a green-color filter 224 and a blue-color filter 226.

The third electrode 210 comprising indium tin oxide or indium zinc oxide is formed on the second substrate 200 having the color filters 220 that is formed on the second substrate 200.

Then, the first and second substrates 100 and 200 are assembled together, and a liquid crystal material is injected into between the first and second substrates 100 and 200. The liquid crystal material may correspond to vertical alignment mode type having liquid crystal molecules arranged vertically with respect to the first and second substrates 100 and 200.

Embodiment 2

FIG. 8 is a cross-sectional view showing a liquid crystal display apparatus according to a second exemplary embodiment of the present invention. The liquid crystal display apparatus of the present embodiment is same as in Embodiment 1 except for a storage electrode. Thus, the same reference numerals will be used to refer to the same or like parts as those described in Embodiment 1 and any further explanation will be omitted.

Referring to FIG. 8, a first substrate further includes first and second storage lines 180 and 190.

The first storage line 180 is disposed on a same layer as the gate electrode G, such that the first storage line 180 is disposed between the first signal lines 125. The first storage line is formed on both of main and sub regions 110 and 120.

Additionally, a reference signal of third level, which is applied to a third electrode 210, is applied to the first storage line 180. Thus, charges are stored at the first storage line 180 to maintain the data signal during one frame.

The second storage line 190 is disposed on a same layer as the source electrode S and drain electrode D. That is, the second storage line 190 is disposed on an insulation layer 114, such that the second storage line 190 faces the first storage line 180. The second storage line 190 is electrically connected to the second electrode 118, so that charges stored in the first and second storage lines 180 and 190 maintain a voltage that is applied to the second electrode 118.

Thus, electric fields are formed between the second and third electrodes 118 and 210 as long as the liquid crystal display apparatus displays an image, to allow a light to pass through the second and third electrodes 118.

Hereinafter, a method of manufacturing the liquid crystal display apparatus will be explained.

Figure 9A:
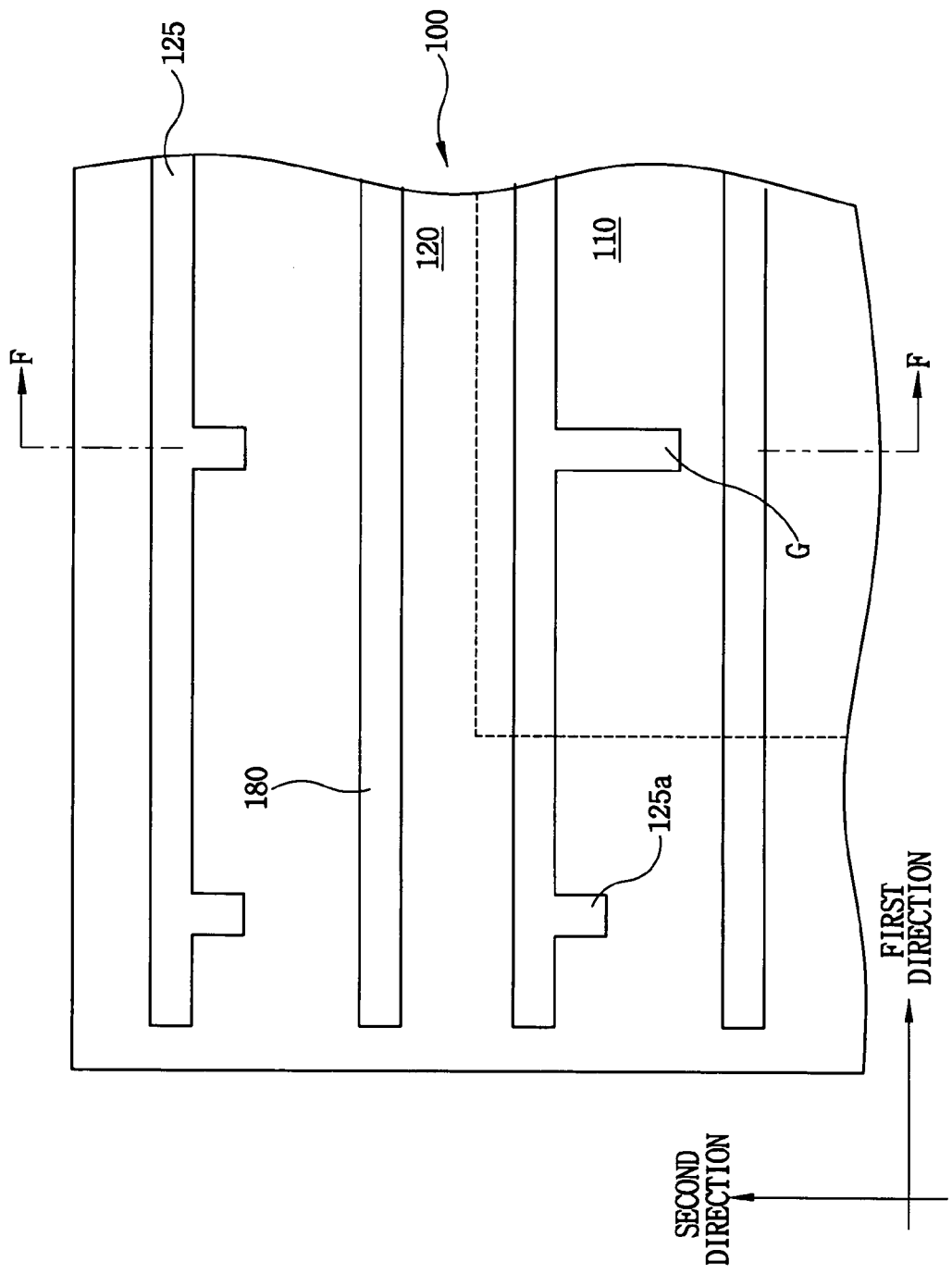
Figure 9B:
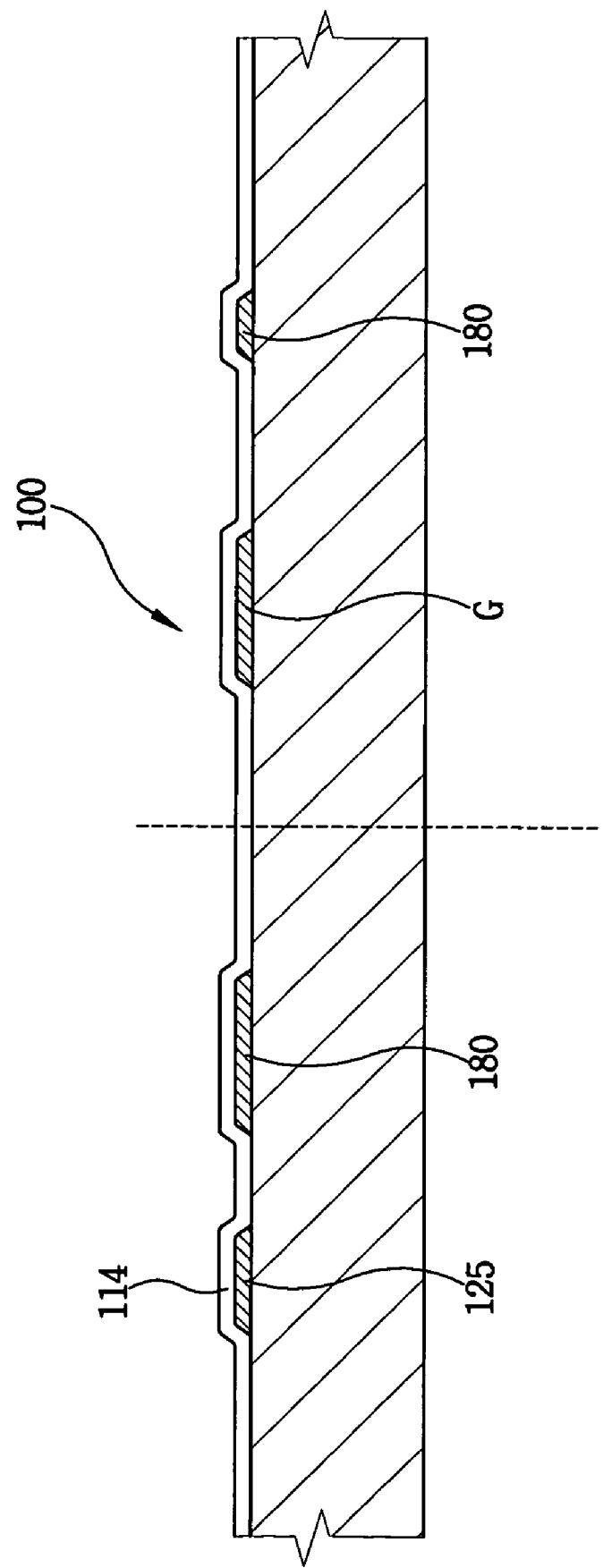

FIG. 9A is a layout showing a first signal line and a first storage line formed on a first substrate according to the second exemplary embodiment of the present invention, and FIG. 9B is a cross-sectional view taken along a line F-F.

Referring to FIGS. 9A and 9B, a metal film is formed on a first substrate 100. The metal film comprising aluminum (Al) or an aluminum alloy, etc., may be formed on the first substrate 100 via sputtering method, chemical vapor deposition, etc.

The metal film is patterned via photolithography and etching to form a first signal line 125 of the first substrate 100.

For example, in case of qVGA liquid crystal display apparatus, 240 number of first signal line 125 is formed. The first signal lines 125 are formed on both main and sub regions 110 and 120, such that the first signal lines 125 are spaced apart by a same distance with each other. The first signal lines 125 are extended in a first direction, and disposed in parallel with each other in a second direction.

A first storage line 180 is formed of the metal film. The first storage line 180 is disposed between the first signal lines 125. The first storage line 180 is in parallel with the first signal line 125, and the first storage line 180 is formed on both of the main and sub regions 110 and 120.

A gate electrode G protrudes from the first signal line 125, such that the gate electrode G is disposed in the main region 110. A voltage applying portion 125a protrudes from the first signal line 125, such that the voltage applying portion 125a is disposed in the sub region 120.

Referring to FIG. 9B, a gate insulation layer 114 is formed on the first substrate 110 having the gate electrode G formed on the first substrate 110.

Figure 9C:
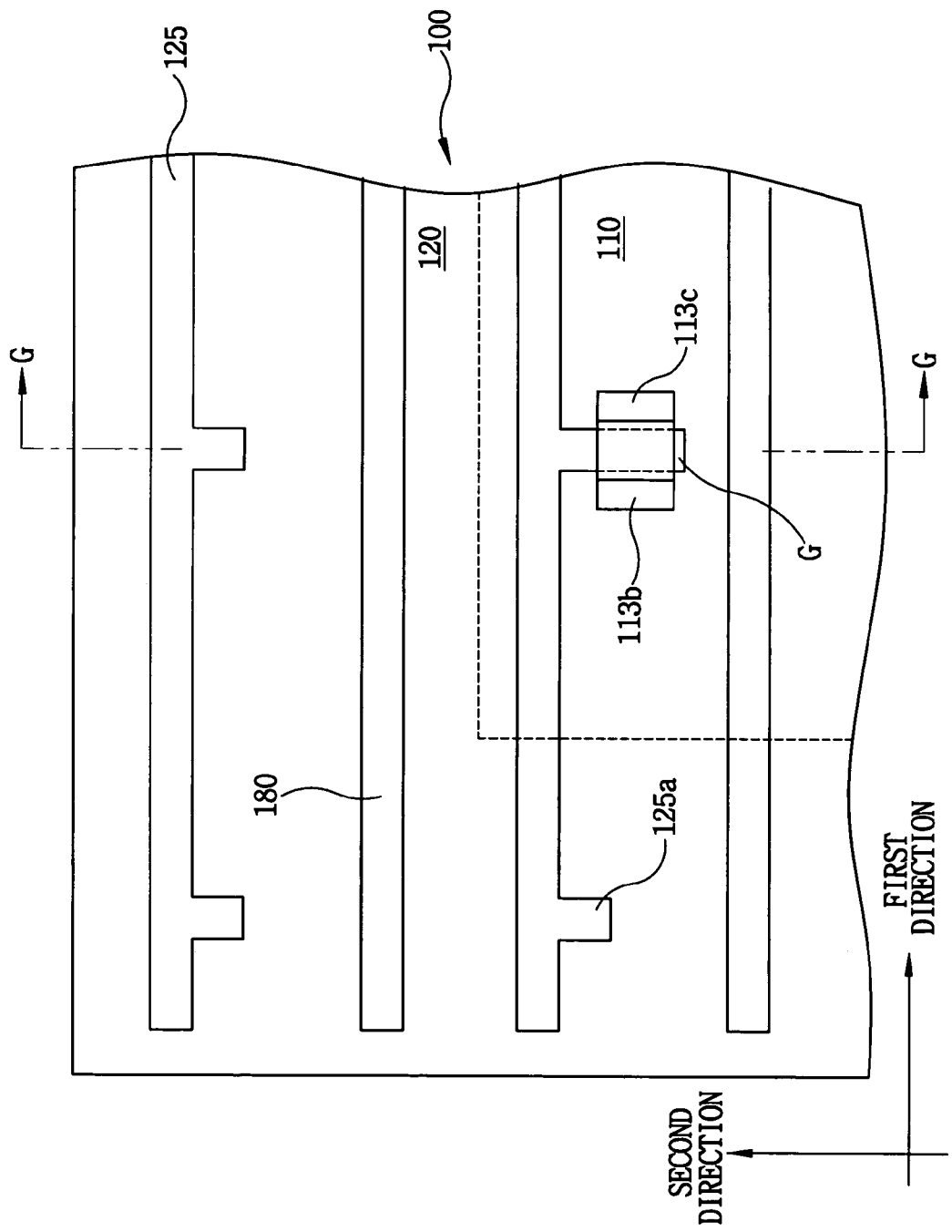
Figure 9D:
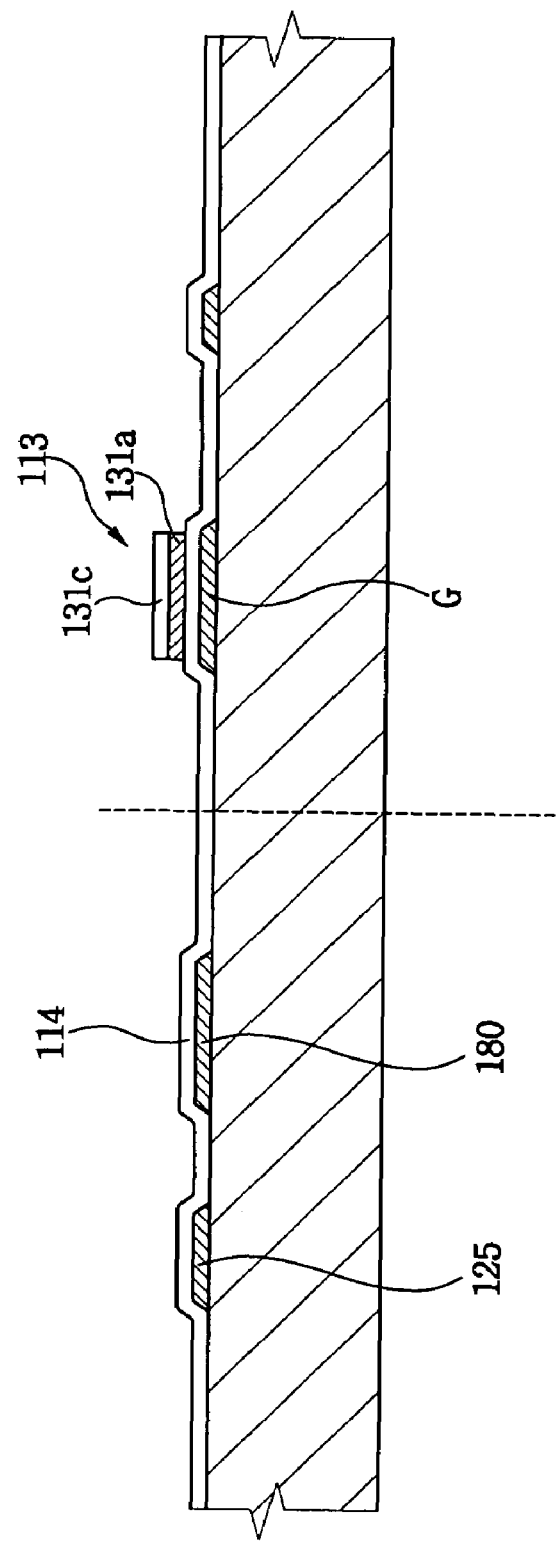

FIG. 9C is a schematic layout showing a channel layer formed on a gate electrode, and FIG. 9D is a cross-sectional view taken along the line G-G.

Referring to FIGS. 9C and 9D, an amorphous silicon layer and an n+ amorphous silicon layer are formed on a gate insulation layer 114 in sequence. The amorphous silicon layer and n+ amorphous silicon layer are patterned via photolithography and etching to form a channel layer 113.

The channel layer 113 includes an amorphous silicon pattern 113a that covers the gate electrode G, and first and second n+ amorphous silicon patterns 113b and 113c formed on the amorphous silicon pattern 113a. The first and second n+ amorphous silicon patterns 113b and 113c are spaced apart with each other.

FIG. 9E is a schematic layout showing a second signal line, a second storage line and a drain electrode formed on a first substrate, and FIG. 9F is a cross-sectional view taken along the line H-H of FIG. 9E.

Referring to FIGS. 9E and 9F, a metal layer is formed on a first substrate 100 via a sputtering method or a chemical vapor deposition, such that a channel layer 113 is covered. The metal layer is patterned via a photolithography and etching to form a second signal line 130, a drain electrode D and a second storage line 190. The second signal line 130 is extended in a second direction that is substantially perpendicular to the first direction, and a source electrode S protrudes from the second signal line 130. The source electrode S is electrically connected to the first n+ amorphous silicon pattern 113b, and the drain electrode D is electrically connected to the second n+ amorphous silicon pattern 113c.

The second storage line 190 is disposed on the gate insulation layer 114 of the sub region 120. In detail, the second storage line 190 is disposed over the first storage line 180.

Figure 9G:
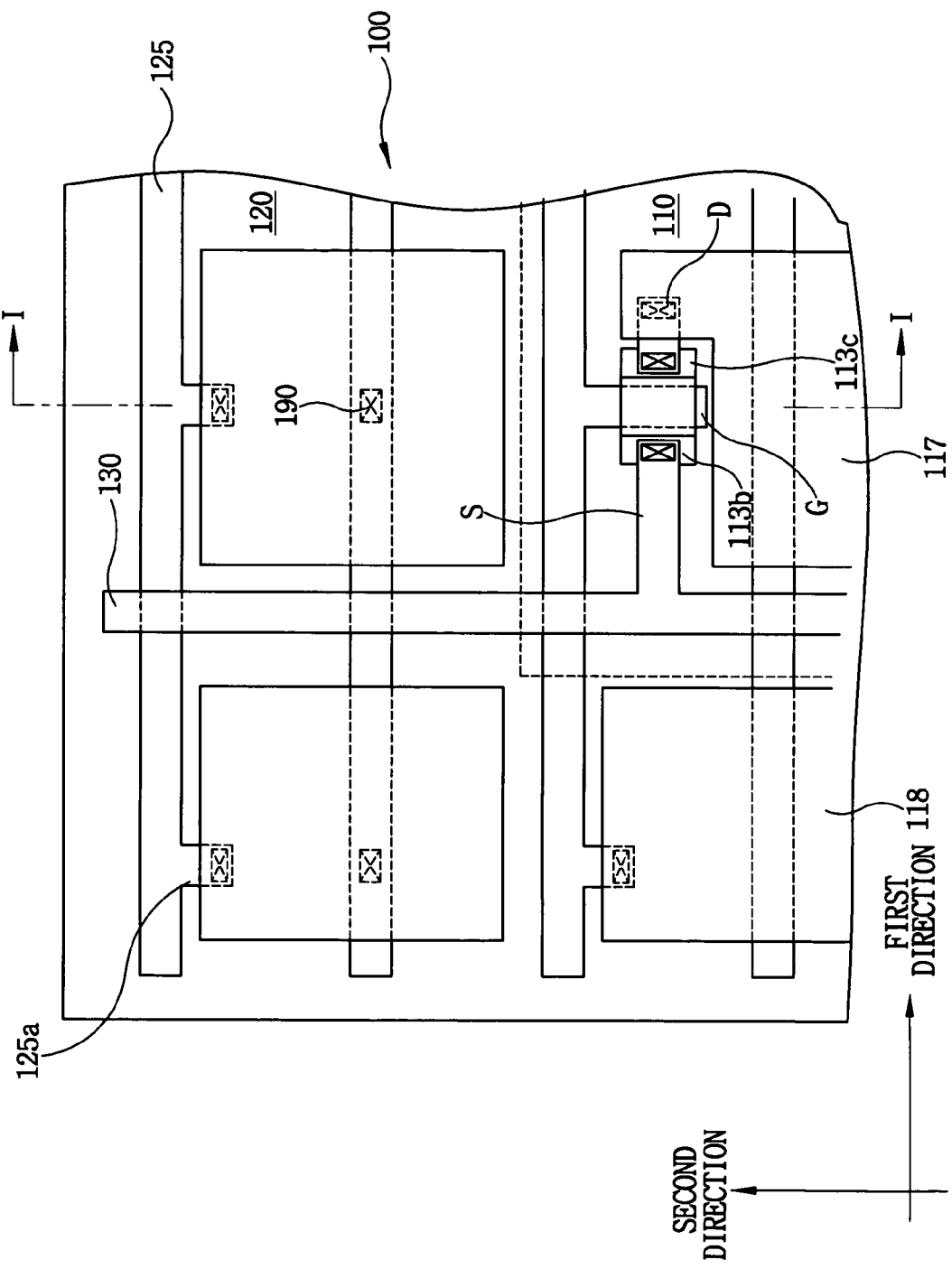
Figure 9H:
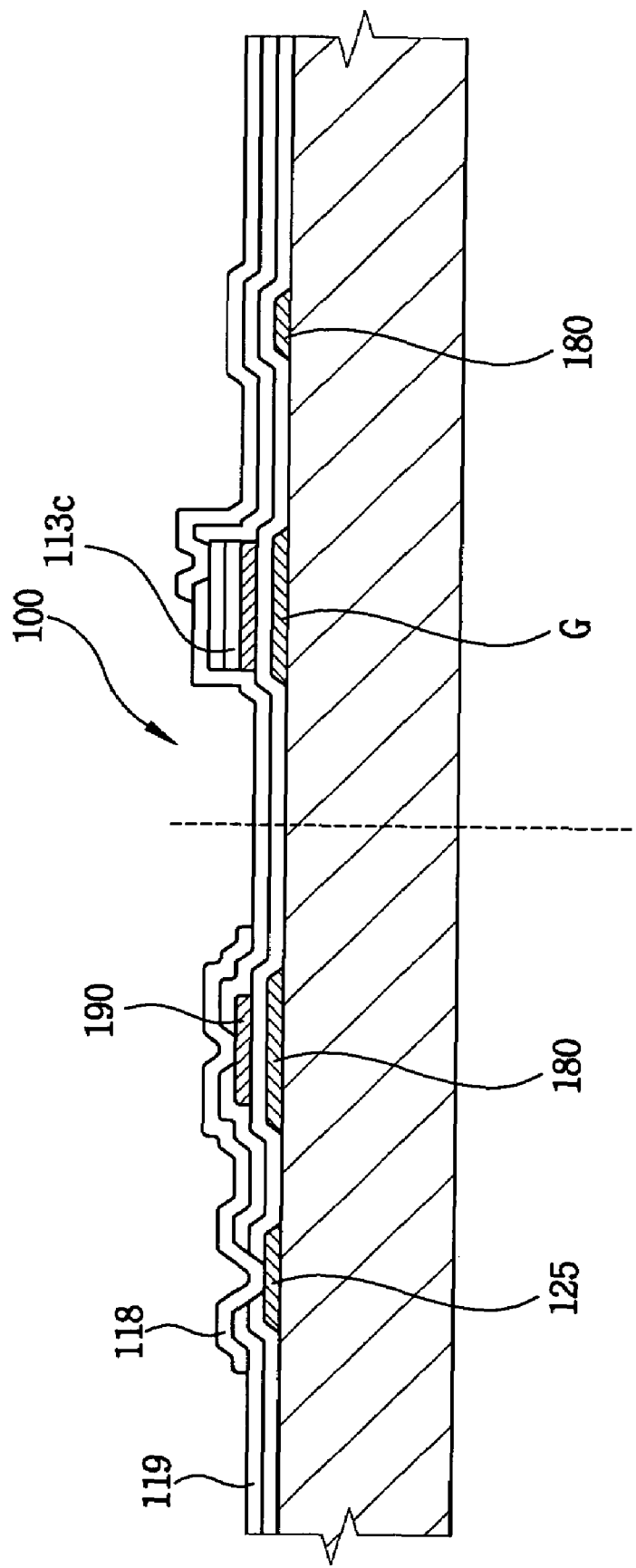

FIG. 9G is a layout showing first and second electrodes formed on main and sub regions respectively, and FIG. 9H is a cross-sectional view taken along the line I-I of FIG. 9G.

Referring to FIGS. 9G and 9H, a conductive and transparent thin film is formed on a protection layer 119. The conductive and transparent thin film comprises indium tin oxide or indium zinc oxide. The conductive and transparent thin film is patterned via photolithography and etching to form first and second electrodes 117 and 118 in main and sub regions, respectively. The first electrode 117 is electrically connected to the drain electrode D, and the second electrode 118 is electrically connected to first and second signal lines 125 and 190.

A method of manufacturing a second substrate is same as the embodiment 1. Thus, any further explanations will be omitted.

The first and second substrates 100 and 200 are assembled together, and liquid crystal material is injected into between the first and second substrates 100 and 200 to form a liquid crystal display apparatus. The liquid crystal display apparatus may correspond to vertical alignment mode.

In the embodiments described above, a transmissive type liquid crystal display apparatus is explained for an example. However, the present invention may be applied to a reflective type liquid crystal display apparatus or a reflective and transmissive type liquid crystal display apparatus.

According to an embodiment of the present invention, a bright line surrounds main region through which images are displayed. Thus, the bright line brings out the images. That is, the images are better defined.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display apparatus comprising:
   i.) a first substrate including:
   a main region having switching devices and first pixel electrodes, the switching devices applying data signals to the first pixel electrodes to display an image in response to a gate signal; and
   a sub region having second electrodes, the gate signal also being applied to switching devices serving the second electrodes, the sub region being disposed at a circumference of the main region;

ii) a second substrate including a third electrode that faces the first and second electrodes, a reference signal being applied to the third electrode that has a different magnitude from the gate signal being applied to the switching devices such that light is transmitted through the sub region as long as an image is displayed in the main region; and iii) a liquid crystal layer interposed between the first and second substrates.

2. The liquid crystal display apparatus of claim 1, wherein the liquid crystal layer corresponds to vertical alignment mode.

3. The liquid crystal display apparatus of claim 1, wherein electric fields are formed between the second and third electrodes regardless of the data signal.

4. The liquid crystal display apparatus of claim 1, wherein the first electrodes are arranged in a matrix shape at the main region, and the second electrodes are arranged in succession with the first electrodes at the sub region.

5. The liquid crystal display apparatus of claim 4, wherein the second electrodes are arranged along a plurality of columns.

6. The liquid crystal display apparatus of claim 1, wherein the gate signal is in a range from about -10V to about 10V, and the reference signal is selected from the range.

7. The liquid crystal display apparatus of claim 1, wherein the first substrate further includes first and second signal lines extended from the sub region to the main region respectively, the first signal line transfers the gate signal, and the second signal line transfers the data signal.

8. The liquid crystal display apparatus of claim 7, wherein the first signal line is electrically connected to the second electrode and a gate electrode of the switching device.

9. The liquid crystal display apparatus of claim 7, wherein the second signal line is electrically connected to a source electrode of the switching device.

10. The liquid crystal display device of claim 7 wherein the first substrate further includes a first storage line formed of a same layer as the first signal line, the first storage line is substantially parallel with the first signal line, and the first storage line maintains a voltage that is applied to the second electrode.

11. The liquid crystal display device of claim 10, wherein the first substrate further includes an insulation layer and the second storage line formed on the insulation layer, the insulation layer electrically insulates the first signal line and the first storage line from each other, and the second storage line maintains a voltage that is applied to the second electrode.

* * * * *